(12) United States Patent
Matsuda et al.

(10) Patent No.: US 9,256,802 B2
(45) Date of Patent: Feb. 9, 2016

(54) OBJECT OR SHAPE INFORMATION REPRESENTATION METHOD

(75) Inventors: Yuma Matsuda, Tokyo (JP); Masatsugu Ogawa, Tokyo (JP); Masafumi Yano, Miyagi (JP); Susumu Kawakami, Miyagi (JP)

(73) Assignees: NEC CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 193 days.

(21) Appl. No.: 13/988,655

(22) PCT Filed: Nov. 11, 2011

(86) PCT No.: PCT/JP2011/076599
§ 371 (c)(1),
(2), (4) Date: May 21, 2013

(87) PCT Pub. No.: WO2012/070474
PCT Pub. Date: May 31, 2012

(65) Prior Publication Data
US 2013/0236108 A1  Sep. 12, 2013

(30) Foreign Application Priority Data

Nov. 26, 2010 (JP) .................................. 2010-263877
Sep. 28, 2011 (JP) .................................. 2011-213005

(51) Int. Cl.
*G06K 9/46* (2006.01)
*G06K 9/48* (2006.01)

(52) U.S. Cl.
CPC ....................................... *G06K 9/48* (2013.01)

(58) Field of Classification Search
CPC ...... G06K 9/48; G06K 9/00362; G06K 9/6207; G06T 7/0083
See application file for complete search history.

(56) References Cited

U.S. PATENT DOCUMENTS 6,424,746 B1 * 7/2002 Nishida .......................... 382/195
6,650,778 B1 * 11/2003 Matsugu ............ G06K 9/00362
382/190
6,907,140 B2 * 6/2005 Matsugu et al. .............. 382/195
(Continued)

FOREIGN PATENT DOCUMENTS

JP  62-28887 A  2/1987
JP  6470890 A  3/1989
(Continued)

OTHER PUBLICATIONS

Mokhtarian, Farzin, et al., "Scale-Based Description and Recognition of Planar Curves and Two-Dimensional Spaces", IEEE Transactions on Pattern Analysis and Machine Intelligence, Jan. 1986, pp. 34-43, vol. 8, No. 1.

(Continued)

*Primary Examiner* — Gregory M Desire
(74) *Attorney, Agent, or Firm* — Sughrue Mion, PLLC

(57) ABSTRACT

An information representation method for representing an object or a shape includes: dividing a contour shape of an entirety or a part of the object or the shape into one or a plurality of curves; and representing the contour shape of the object or the shape by parameters including a degree of curvature and a positional relationship of each curve obtained by the dividing. Therefore, there is provided an information representation method for an object or a shape, which is capable of robust object recognition against a change in image by geometric transformations and occlusions.

17 Claims, 11 Drawing Sheets

(56) References Cited

U.S. PATENT DOCUMENTS

| | | | | |
|---|---|---|---|---|
| 8,331,619 | B2* | 12/2012 | Ikenoue | G06T 7/0083 348/169 |
| 2002/0080425 | A1* | 6/2002 | Itokawa | G06K 9/6207 358/496 |
| 2007/0127816 | A1 | 6/2007 | Balslev et al. | |
| 2011/0274321 | A1* | 11/2011 | Kono | G06T 7/0012 382/128 |
| 2013/0236108 | A1* | 9/2013 | Matsuda et al. | 382/203 |

FOREIGN PATENT DOCUMENTS

| | | |
|---|---|---|
| JP | 2-302880 A | 12/1990 |
| JP | 4-191988 A | 7/1992 |
| JP | 6-309465 A | 11/1994 |
| JP | 10-55447 A | 2/1998 |
| JP | 2002-352252 A | 12/2002 |
| JP | 200351014 A | 2/2003 |
| JP | 2005165791 A | 6/2005 |
| JP | 2005-346391 A | 12/2005 |
| JP | 2007-502473 A | 2/2007 |
| JP | 2007-172409 A | 7/2007 |

OTHER PUBLICATIONS

Lowe, D. G., "Object Recognition from Local Scale-Invariant Features", Proc. of IEEE International Conference on Computer Vision, Sep. 1999, pp. 1150-1157.

Office Action dated May 21, 2014, issued by the Japan Patent Office in corresponding Japanese Application No. 2012-545710.

* cited by examiner

| IMAGE IDENTIFIER | NUMBER OF INFLECTION POINTS UPON SMOOTHING | DIVIDED CONTOUR IDENTIFIER | ARC LENGTH | CURVATURE | X COORDINATE | Y COORDINATE | DIRECTION |
|---|---|---|---|---|---|---|---|
| F1 | N1 | C1 | S1 | K1 | X1 | Y1 | D1 |
|  | N1 | C2 | S2 | K2 | X2 | Y2 | D2 |
|  | N1 | C3 | S3 | K3 | X3 | Y3 | D3 |
| ... | ... | ... | ... | ... | ... | ... | ... |
FIG. 8
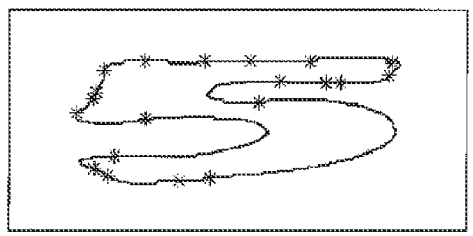   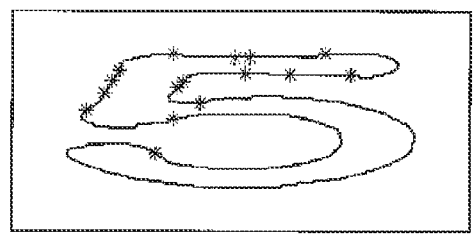
FIG. 9A   FIG. 9B
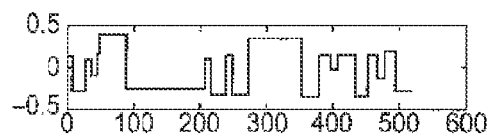   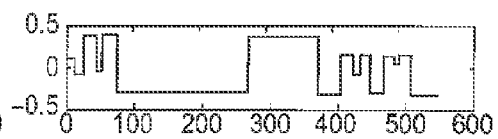
FIG. 10A   FIG. 10B

OBJECT OR SHAPE INFORMATION REPRESENTATION METHOD

CROSS REFERENCE TO RELATED APPLICATIONS

This application is a National Stage of International Application No. PCT/JP2011/076599 filed Nov. 11, 2011, claiming priority based on Japanese Patent Application Nos. 2010-263877 filed Nov. 26, 2010 and 2011-213005 filed Sep. 28, 2011, the contents of all of which are incorporated herein by reference in their entirety.

TECHNICAL FIELD

This invention relates to an information representation method for an object or a shape.

BACKGROUND ART

In recent years, as digital image devices such as digital cameras have rapidly prevailed, an expectation for generic object recognition for recognizing what objects are contained in a taken picture image and video is increasing. The generic object recognition has a possible use for various applications such as proper classification of image data stored in a database without being classified, search for necessary image data, further, extraction of a desired scene from a motion image, and cutting out only desired scenes to re-edit then.

As technologies for the object recognition, various recognition technologies such as face recognition and fingerprint recognition have been developed, and all of them are directed to specific applications. If such a recognition technology specialized in a certain single application is used to another application, there arise such a problem that a recognition rate immediately decreases and the like. Therefore, development of technologies for recognizing a generic object is expected.

In order to recognize a generic object, it is necessary to extract feature amounts of an image subject to recognition. As methods for extracting feature amounts, methods of using geometrical features contained in an image, which are described in Patent Literature 1 and Patent Literature 2, are widely known. However, most of those feature amounts cannot be calculated unless parameters such as thresholds are set in advance based on statistical learning or experience of a user. A method which requires the statistical learning and the experience of a user cannot calculate a feature amount for an image which has not been learned, and poses such a problem that an erroneous recognition result is provided.

As a method to calculate a feature amount without necessity of the statistical learning or the experience of a user, a method described in Non Patent Literature 1 and called Scale Invariant Feature Transform (SIFT), which uses a histogram accumulating a local intensity gradient of an image, is widely recognized. By using this technology, the same images including geometric transformations and occlusions can be recognized as being the same. However, this technology is intended to determine whether or not two images are the same, and cannot provide information on to what degree two similar image are similar.

Moreover, recognition using a representation method described in Non Patent Literature 2 and called Curvature Scale Space (CSS), which involves smoothing an image contour stepwise and representing the image by using positions of inflection points of the counter at each step, is also well known. It is known that position information on the inflection points used in this technology has a very similar appearance pattern for the same images or similar images. Thus, by using this technology, images same or similar in contour can be recognized, or images obtained by applying a geometric transformation to the images can be recognized as the same or similar images. However, this technology does not use information on points other than the inflection points at all, but uses only very limited information out of information on the contours. Therefore, for images similar in contour to each other, if the pieces of position information on inflection points are different from each other, it may be determined that the images are not "similar" to each other. Moreover, even for images dissimilar in contour to each other, if pieces of position information on inflection points are relatively similar to each other, it may be determined that the images are "similar" to each other. In other words, this technology cannot calculate a degree of similarity based on features in contour.

On the other hand, a method of recognition based on curvature information on respective points on a contour is also proposed (Patent Literature 3). This technology uses the curvature information on all points on the contour, and can calculate a degree of similarity for contours slightly different in contour shape. However, this technology assumes comparison in contour for an entire periphery of an outline of a shape. As a result, if a contour is disconnected halfway or a part of an object shape overlaps another object shape in an image, this technology cannot be used.

CITATION LIST

Patent Literature

Patent Document 1: Japanese Unexamined Patent Application Publication (JP-A) 2002-352252

Patent Document 2: Japanese Unexamined Patent Application Publication (JP-A) 2005-346391

Patent Document 3: Japanese Unexamined Patent Application Publication (JP-A) 10-055447

Non Patent Literature

Non-Patent Document 1: Lowe, D. G, Object recognition from local scale invariant features, Proc. of IEEE International Conference on Computer Vision, pp. 1150-1157

Non-Patent Document 2: FARZIN MOKHTARIAN AND ALAN MACKWORTH, Scale-based description and Recognition of Planar curves and two-dimensional spaces, IEEE Transactions on Pattern Analysis and Machine Intelligence Vol. 8, No. 1, pp. 34-43

DISCLOSURE OF THE INVENTION

The conventional object recognition methods determine, based on the statistical learning and experience of a user, parameters for calculating feature amounts to be extracted. As a result, it is hard to recognize an image which has not been learnt. On the other hand, the method of calculating a feature amount without necessity of the statistical learning or the experience of a user has such a problem that, when a shape to be recognized does not have a complete contour, a degree of similarity having enough information is difficult to calculate.

It is therefore an object of this invention to provide an information representation method for an object or a shape, which is capable of determining a degree of similarity representing to what degree two different images are similar to each other, and of robust object recognition against a change in image by geometric transformations and occlusions.

According to one mode of this invention, there is provided an information representation method for representing an object or a shape, including: dividing a contour shape of an entirety or a part of the object or the shape into one or a plurality of curves; and representing the contour shape by parameters including a degree of curvature and a positional relationship of each curve obtained by the dividing.

An effect of the one mode of this invention is to provide an approach of recognizing a generic object without necessity of the statistical learning and the experience of a user. In particular, for shapes that generally exist, such as shapes which are similar but different in detail such as hand writings, object shapes of which it is difficult to extract entire contours from background information, object shapes of which it is difficult to extract entire contours due to a lack of parts of shapes because of occlusions and other such reasons, and object shapes of which it is difficult to extract entire contours due to discontinuity inside shapes, a method for robust recognition is provided.

BRIEF DESCRIPTION OF THE DRAWING

FIG. 8 is a table illustrating an example of information output by a contour arc length/curvature/position output unit included in the image processing device of FIG. 1.

FIGS. 9A and 9B are diagrams illustrating an example of two contour lines subject to determination for similarity/dissimilarity in the image processing device of FIG. 1.

FIGS. 10A and 10B are graphs respectively illustrating results of profiling of arc length information and curvature information acquired from the contour lines of FIGS. 9A and 9B.

BEST MODE FOR EMBODYING THE INVENTION

A detailed description is now given of embodiments of this invention referring to drawings.

Figure 1:
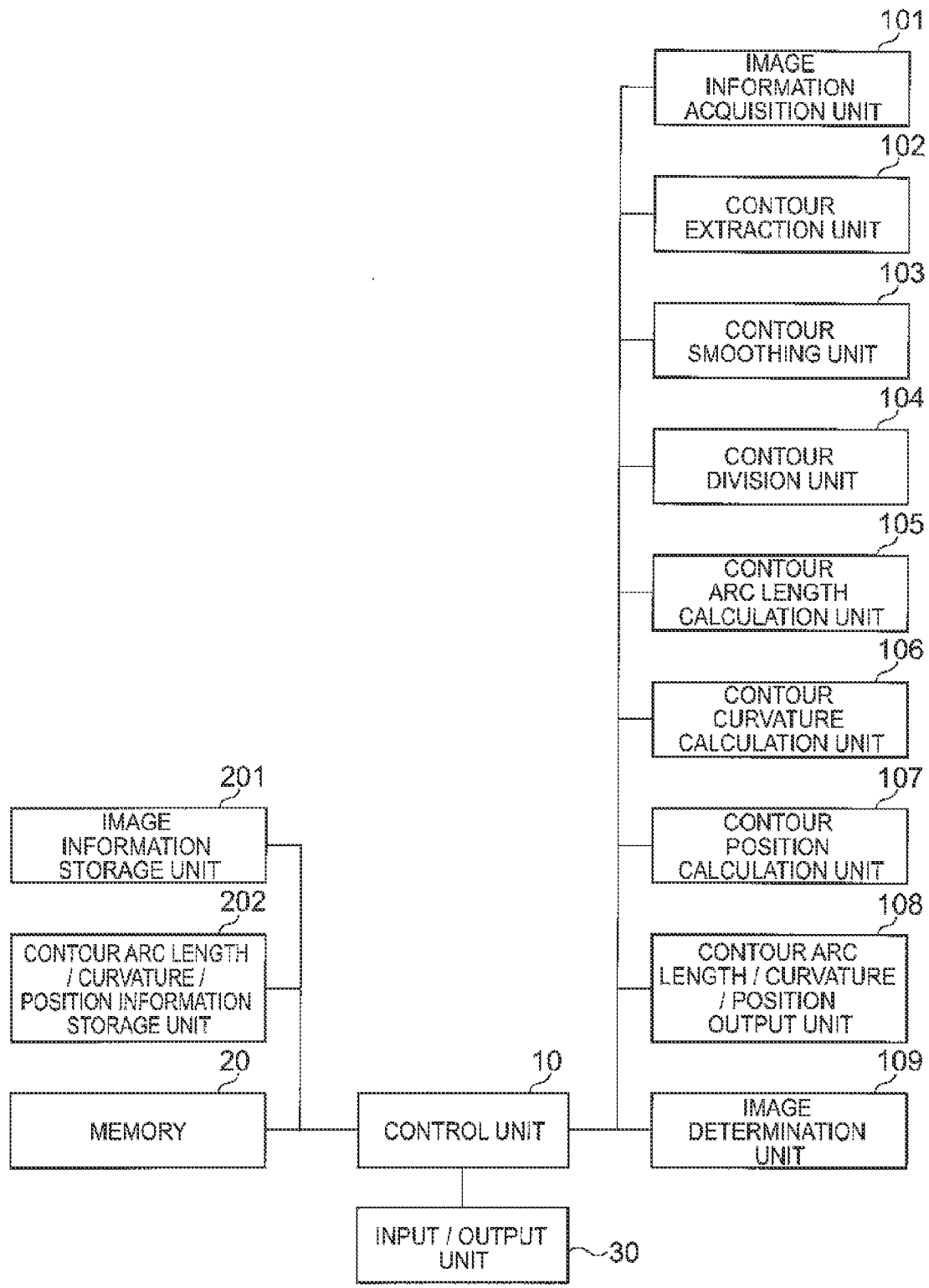
FIG. 1 is a block diagram illustrating a schematic configuration of an image processing device according to a first embodiment of this invention.

The representation method of representing an object or a shape according to a first embodiment of this invention is realized by, for example, an image processing device illustrated in FIG. 1.

The image processing device of FIG. 1 includes a control unit 10, a memory 20, an input/output unit 30, an image information acquisition unit 101, a contour extraction unit 102, a contour smoothing unit 103, a contour division unit 104, a contour arc length calculation unit 105, a contour curvature calculation unit 106, a contour position calculation unit 107, a contour arc length/curvature/position output unit 108, an image determination unit 109, an image information storage unit 201, and a contour arc length/curvature/position information storage unit 202.

Figure 2:
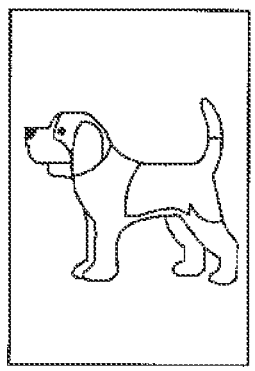
FIG. 2 is a view illustrating an example of an image represented by image information acquired by an image information acquisition unit included in the image processing device of FIG. 1.

The image information acquisition unit 101 picks out image information (image data) such as a photograph specified by a user with the input/output unit 30, from the image information storage unit 201. Alternatively, the image information acquisition unit 101 may acquire image information from an image input unit (not shown) such as a scanner. The image information acquisition unit 101 may carry out conversion processing for facilitating subsequent processing when the image information is acquired, such as color/black and white conversion. FIG. 2 illustrates an example of an image represented by the image information acquired by the image information acquisition unit 101. The image in FIG. 2 includes only one object (dog).

Figure 3:
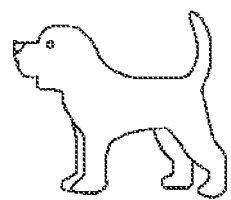
FIG. 3 is a view illustrating an example of contour lines represented by contour information extracted by a contour extraction unit included in the image processing device of FIG. 1.

The contour extraction unit 102 extracts contour information (contour lines) of objects included in the image from the image information acquired by the image information acquisition unit 101. The contour information can be extracted by extracting points at which the hue, the chroma, the lightness, and the like change sharply by means of the Laplacian of Gaussian filter, for example. Of course, the method of extracting contour information is not limited to the above-mentioned method. The extracted contour information of the object is represented by a set of contour points represented as (x, y) by the Cartesian coordinate system, or the like. FIG. 3 illustrates an example of contour lines represented by the contour information extracted by the contour extraction unit 102.

Figure 4:
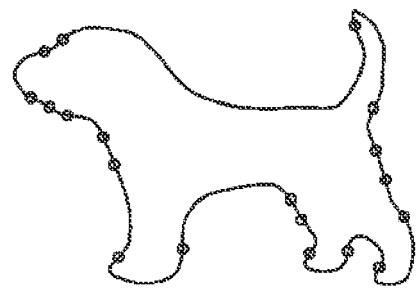
FIG. 4 is a view illustrating an example of the contour line smoothed to a certain smoothing level.
Figure 5:
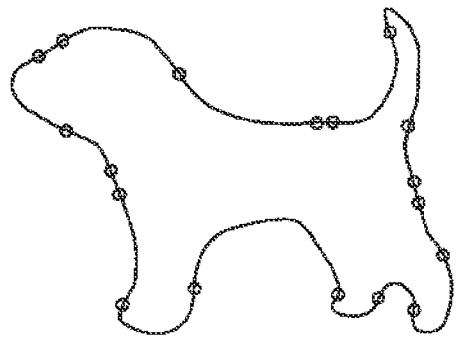
FIG. 5 is a view illustrating an example of smoothing the contour line illustrated in FIG. 4 to a higher smoothing level.
Figure 6:
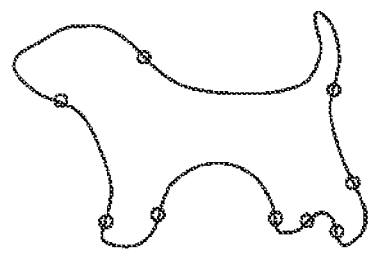
FIG. 6 is a view illustrating an example of smoothing the contour line illustrated in FIG. 5 to a higher smoothing level.

The contour smoothing unit 103 carries out stepwise multiple-stage smoothing on the contour lines extracted by the contour extraction unit 102. For the smoothing, convolution by means of the Gaussian filter, for example, can be used, but the means for the smoothing is not limited to the convolution. The smoothing is carried out in order to first remove influence of noise on subsequent processing, and is carried out to subsequently acquire a plurality of pieces of stepwise (stratified) contour information (smoothed contour lines). As described later, by acquiring, for each of the plurality of pieces of stepwise contour information, a degree of similarity to pieces of stepwise contour information acquired for an object in another image, the degree of similarity of the shapes of the objects can be acquired at a higher accuracy. A degree of smoothing (smoothing level) is determined based on the number of times of the smoothing or the number of "inflection points" to be described later. FIGS. 4 to 6 illustrate an example of the multi-stage (hierarchical) smoothing based on the number of the inflection points as a guideline. The number of "inflection points" decreases as a result of repetition of the smoothing, and is finally converged to zero (any contour of a closed surface becomes a convex graphic after the smoothing level reaches a certain degree or higher).

The smoothing is required if the hierarchizing is carried out by means of the smoothing, but the smoothing is not necessarily required if the hierarchizing is carried out by means of another method.

The contour division unit 104 functions as division means for dividing the contour line at each of the smoothing levels smoothed by the contour smoothing unit 103 into one or more partial contour lines. The division is carried out while points characteristic in degree of curvature in the smoothed contour line are considered as division points. As a result of the use of such division points, the partial contour line becomes a curved line. If there is no division point, the division is not carried out. In this case, the divided contour line after the division matches the entire contour line before the division. In this way, the contour shape of the entirety or a part of the object or the shape is divided into one or a plurality of curved lines.

On this occasion, the "degree of curvature" is an amount defined based on a characteristic relating to the curvature of the curved line such as the Euclidian curvature, the Euclidian radius of curvature, or the affine curvature, and is an amount describing to what degree the curved line is distorted compared with a straight line. Any one of those amounts may be used as the amount defining the degree of curvature of the curved line, and the Euclidian curvature is used on this occasion. In other words, the contour division unit 104 divides the contour line while the inflection points in the Euclidian curvature on the contour line are considered as division points.

Moreover, the "inflection point" means a point at which the sign of the curvature changes on the contour line. The inflection point in the Euclidian curvature is invariant with respect to projection transformation, and is thus a point robust against the geometric transformation. In other words, by using the inflection points in the Euclidian curvature as division points, points robust against the geometric transformation can be set as division points.

Figure 7:
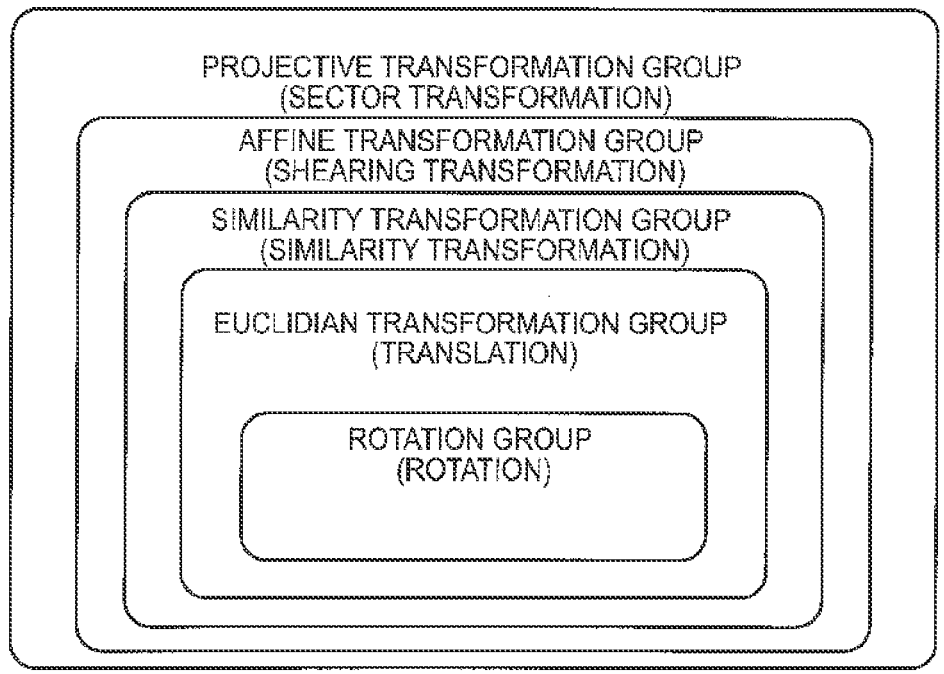
FIG. 7 is a diagram illustrating geometric transformations.

On this occasion, referring to FIG. 7, a description is given of the geometric transformations. In FIG. 7, "transformation group" is a group including each of geometric transformations as an element. As appreciated from FIG. 7, the Euclidian geometric transformations (including rotations) are transformations including rotations and translations. Moreover, the affine geometric transformations (including similarity transformations) are transformations obtained by adding scaling/shearing transformations to the Euclidian geometric transformations. In addition, projective transformations are obtained by adding the fan-shaped transformations to the affine transformations. Thus, a relationship: (projective transformations) ⊃ (affine transformations) ⊃ (Euclidian transformations) is established, and the projective transformations are geometric transformations in the broadest sense out thereof. The inflection point in the Euclidian curvature is an invariable with respect to the projective geometric transformations, and can be considered to be robust in the geometric transformations in the broadest sense. In other words, if the inflection point in the Euclidian curvature is set to a division point, the division point is a division point robust against the geometric transformations.

A description is now given of the division method for a contour line while inflection points in the Euclidian curvature are division points.

First, one arbitrary point is set as a start point, and coordinates t of contour points are selected so as to go around the contour line. At each of the contour points, a Euclidian curvature κ(t) defined by the following Equation (1) is calculated, and points having a value of the Euclidian curvature of zero are extracted as division points of the contour.

$$\kappa(t) = \frac{\dot{x}\ddot{y} - \dot{y}\ddot{x}}{(\dot{x}^2 + \dot{y}^2)^{2/3}} \quad (1)$$

On this occasion, ☐ and ☐ respectively represent a first order derivative and a second order derivative of x with respect to t. The same holds true for ☐ and ☐.

As described above, before the contour line is divided by the contour division unit 104, as preprocessing thereof, it is preferred to carry out the smoothing to a certain degree. With the smoothing as the preprocessing, the contour line can be divided without influence of a degree of local curvature when noise is high. Moreover, the division of the contour line is carried out for smoothed contour lines at all the smoothing levels obtained by the plurality of stages of smoothing. If the length of the contour line is not enough for subsequent processing, the entire contour line may be considered as a divided contour line, and the division may not be carried out further.

The division method for the contour line by using inflection points in the Euclidian curvature has been described above, but the division method for the contour is not limited to this method.

The contour arc length calculation unit 105 calculates an arc length of each of the divided contour lines divided by the contour division unit 104. On this occasion, the arc length may be any of the Euclidian arc length and the affine arc length, but the affine arc length is preferably used. The affine arc length is an invariable with respect to the equivalent affine geometric transformations (including the Euclidian geometric transformations), and is thus a more robust amount with respect to the geometric transformations. The affine arc length s is defined by the following Equation (2).

$$s = \int_{t_1}^{t_2} \det(p'(t)p''(t))^{1/3} dt \quad (2)$$

On this occasion, $t_1$ and $t_2$ respectively represent coordinates of a start point and an end point of each of the divided contour lines. Note that, the start point and the end point are points which can be determined by a shape of the divided contour line.

The contour curvature calculation unit 106 calculates a curvature of each of the divided contour lines divided by the contour division unit 104. On this occasion, the curvature may be any of the Euclidian curvature and the affine curvature, but the affine curvature is preferably used. The affine curvature is an invariable with respect to the equivalent affine geometric transformations including the equivalent Euclidian geometric transformations, and is thus a more robust amount with respect to the geometric transformations. The affine curvature $\kappa_A$ is defined by the following Equation (3).

$$\kappa_A(s(t)) = \det(p''(s(t))p'''(s(t))) \quad (3)$$

On this occasion, p denotes a coordinate vector $$p = \begin{pmatrix} x \\ y \end{pmatrix},$$

and p″ and p‴ respectively represent a second order derivative and a third order derivative of p with respect to s.

The curvature information calculated by the contour curvature calculation unit 106 may define curvature information on all contour points included in the divided contour line as a vector having as many dimensions as the number of the contour points, or may be represented by values such as an average value, or the maximum/minimum values. Both the arc length and the curvature of the divided contour line are invariables with respect to the equivalent affine transformations, and an effect brought about by determining both the arc length and the curvature of the divided contour line is thus to provide invariables with respect to the affine geometric transformation accompanying scaling by taking a ratio of one to the other thereof. Note that, the contour point is a point which can be determined by the shape of the divided contour line.

Both the arc length information calculated by the contour arc length calculation unit 105 and the curvature information calculated by the contour curvature calculation unit 106 are feature amounts (parameters) representing the degree of curvature of a corresponding divided contour line, and as a result, a feature of a contour is represented by the parameters. In this way, the contour arc length calculation unit 105 and the contour curvature calculation unit 106 respectively function as parameter calculation means.

The contour position calculation unit 107 calculates a position (also referred to as positional relationship) of each of the divided contour lines divided by the contour division unit 104. On this occasion, as the position, coordinates of the inflection points on the both ends of the divided contour line or coordinates of a center of gravity calculated by the respective contour point coordinates forming the divided contour line may be used. As the coordinates, in addition to the coordinates in the Cartesian coordinate system, various coordinates such as the coordinates in the polar coordinate system may be used. The use of the polar coordinate system can enable to represent, in addition to the positional relationship including a size, a positional relationship by a relative angle.

Alternatively, numbers assigned clockwise or counter-clockwise in sequence along the contour line may be employed as the information on the position.

Further, as the information on the position of the divided contour line, in addition to the absolute position or the relative position of the divided contour line, the direction toward which a protruded portion of the divided contour line is directed may be included. The direction is described as a direction of a major axis or a minor axis when the respective points included in the divided contour line are approximated by means of the elliptical approximation. The method of describing the direction is not limited to the method by means of the elliptical approximation, and various approaches such as a method of describing the direction as a direction orthogonal to a line connecting the positions of the two end points of the divided contour line with each other can be conceived. Moreover, in addition to the approaches of determining the direction in this way, an approach of describing (with respect to the entire contour line) the direction as a simple protrusion or recess can be conceived.

The position calculation by the contour position calculation unit 107 can be used to determine a mutual positional relationship between divided contour lines relating to one object. Moreover, the position calculation can also be used to determine a mutual positional relationship of a plurality of contour lines included in one image. By observing the positional relationship among the plurality of contour lines, an object can be more precisely recognized, and moreover, even if a contour line represents a part of an object, the object can be recognized. Further, the position calculation is effective for a case where a plurality of contour lines are extracted for a single object.

The contour arc length/curvature/position output unit 108 outputs the arc length information, the curvature information, and the position information respectively calculated by the contour arc length calculation unit 105, the contour curvature calculation unit 106, and the contour position calculation unit 107 as pieces of information representing the feature amounts of each of the divided contour lines to the contour arc length/curvature/position information storage unit 202. FIG. 8 illustrates an example of the information output by the contour arc length/curvature/position output unit 108.

In FIG. 8, a contour line to which an image identifier F1 is assigned is a contour line having a number N1 of inflection points as a result of the smoothing, and is divided into three divided contour lines C1-C3. The divided contour line C1 has an arc length S1, a curvature K1, an X coordinate X1, a Y coordinate Y1, and a direction D1. The same holds true for the divided contour lines C2 and C3.

The image determination unit 109 determines, based on the information (feature amounts) stored in the contour arc length/curvature/position information storage unit 202, match or similarity of two objects (images). The determination can be used to search for an object most similar to one object. Moreover, the determination can be used, in order to classify one object to any of a plurality of groups, to compare the one object to an object representing each of the groups. In any case, the image determination unit picks out information on one object and information on an object for comparison, which is different from the one object, from the contour arc length/curvature/position information storage unit 202, and compares these pieces of information with each other, to thereby determine the match/mismatch (similarity/dissimilarity).

The determination by the image determination unit 109 is carried out by comparing pieces of information on the arc length, the curvature, the position, and the direction in entirety or in part with each other. When a difference (distance in a parameter) in a value represented by each piece of the information or a value determined from these pieces of information is less than a threshold determined in advance, the image determination unit 109 determines that these pieces of information "match (similar to) each other", and otherwise determines that these pieces of information "do not match (are not similar to) each other".

Referring to FIGS. 9A, 9B, 10A, and 10B, a specific description is given of a method of determining similarity/dissimilarity between two contour lines. On this occasion, as the two contour lines, two contour lines representing number "5" in fonts different from each other are exemplified.

FIGS. 9A and 9B illustrate contour lines of the number "5" in the fonts different from each other and inflection points on the contour lines. The contour lines are divided into a plurality of divided contour lines, and the arc length information and the curvature information are obtained from each of the divided contour lines. Then, the obtained arc length information and curvature information are profiled, and profiles respectively illustrated in FIGS. 10A and 10B are acquired. In FIGS. 10A and 10B, the horizontal axis represents an accumulated length of the arc lengths of the divided contour lines, and the vertical axis represents the curvature corresponding to the respective divided contour lines.

A difference between the thus-obtained profiles of the two contour lines is determined. The difference can be obtained, for example, as a result of determining and summing a difference in curvature when lengths corresponding to accumulated arc lengths are equal to each other for accumulated lengths corresponding to the entire arc lengths. By comparing the difference obtained in this way with a threshold set in advance, the similarity/dissimilarity of the two contour lines is determined.

The above-mentioned example is described for the case where each of the two contour lines subject to the determination represents the entire single object, but the determination can be made even if at least one of the two contour lines subject to the determination represents a part of a single object. This is because, according to this embodiment, the contour division unit 104 divides a contour line into one or more partial contour lines, and for each of the partial contour lines, the respective pieces of information on the arc length, curvature, position, and the direction are determined Thus, according to this embodiment, the determination can be made also for an occluded object or shape.

Moreover, in the above-mentioned example, the example in which the similarity/dissimilarity is determined by using the arc length information and the curvature information on all the plurality of divided contour lines has been described, but the similarity/dissimilarity may be determined by using the arc length information and the curvature information on a part of the plurality of divided contour lines. In this case, for example, for two contour lines to be compared, a predetermined number of divided contour lines are selected in a descending order of the arc length, and a difference in curvature is determined for each pair of divided contour lines having the same positions in order. Then, each of the determined differences in curvature is weighted depending on the order of the arc length, and the weighted differences in curvature are summed Based on the sum obtained in this way, the similarity/dissimilarity of the two contour lines is determined According to this method, the entire information does not need to be used, resulting in a reduction in an amount of computation, and in high-speed processing.

The above-mentioned determination is carried out for each of the smoothing levels. As described above, the contour line of each of the objects is smoothed at the plurality of smoothing levels, and the feature amounts are determined for the smoothed contour lines at the respective smoothing levels. By making the comparison in the feature amounts for each of the levels from the highest level to the lowest level of the smoothing, the degree of similarity in shape between the objects is determined.

If the smoothing level increases, all the graphics (contour lines) converge to convex graphics. Therefore, as the smoothing level increases, a possibility of determining that the shapes of the two objects "match (are similar to) each other" increases. Thus, depending on at which smoothing level such a determination that the two objects "match (are similar to) each other" is made, the degree of similarity between the shapes of the two objects can be represented. For example, it is determined that contour lines for the same single object "match (are similar to) each other" at all the smoothing levels. Moreover, it is determined that contour lines for very similar objects "match (are similar to) each other" on stages starting from a relatively low smoothing level. Moreover, it is determined that shapes of objects similar to each other to a certain degree "match (are similar to) each other" when the smoothing level increases. Then, it is determined that shapes of objects which are not similar at all "do no match (are not similar to) each other" even when the smoothing level increases. In this way, by employing the smoothing levels at the plurality of stages, it can be determined which image is "similar to" which image to what degree.

Figure 11:
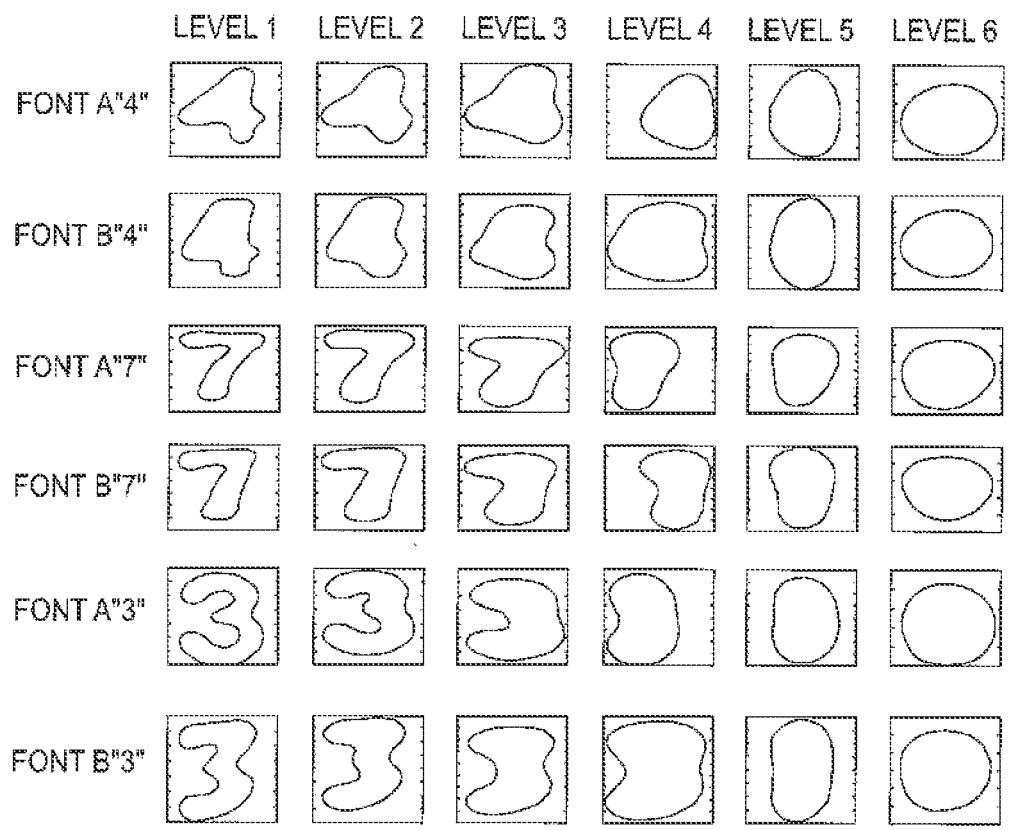
FIG. 11 is a diagram illustrating an example of smoothing contour lines of numbers in two types of fonts at a plurality of stages.

FIG. 11 illustrates an example of the smoothing on a plurality of stages applied respectively to numbers "4", "7", and "3" in two types of fonts A and B. The number of the smoothing levels is six, and the smoothing level increases from the left to the right in the drawing.

A determination result of the similarity/dissimilarity of each of the numbers can vary depending on used feature amounts and set thresholds, but the following determination result is obtained, for example.

At the smoothing levels 5 and 6 (first and second columns from the right in the figure), all the numbers are determined to be "similar" to each other.

At the smoothing level 4 (third column from the right in the figure), the number "4" and each of the numbers "7" and "3" are determined to be "dissimilar" to each other.

At the smoothing level 3 (third column from the left in the figure), the numbers "7" and "3" are determined to be "dissimilar" to each other.

At the smoothing level 1 (first column from the left in the figure), the numbers "4" in the fonts A and B and the numbers "3" in the fonts A and B are determined to be "dissimilar" to each other.

As a result, if the degree of similarity is represented by the smoothing levels 1-6, the degree of similarity of the numbers "7" in the fonts A and B is "1", and the degree of similarity of the numbers "4" in the fonts A and B, and the degree of similarity of the numbers "3" in the fonts A and B are "2". Moreover, regardless of the fonts, the degree of similarity of the numbers "7" and "3" is "4", and the degree of similarity of the numbers "4" and "7" and the degree of similarity of the numbers "4" and "3" are "5".

As described above, the image determination unit 109 can determine, by determining the similarity/dissimilarity of two contour lines for respective smoothing levels, a degree of similarity representing to what degree the contour lines are similar.

Note that, the determination of the degree of similarity by the image determination unit 109 is not necessarily made by means of the smoothing. For example, the smoothing can be replaced by an approach of comparing, on a plurality of stages, partial contours long in arc length, or partial contours specific to a certain graphic.

A description is now given of an operation example of the image processing device of FIG. 1.

Figure 12:
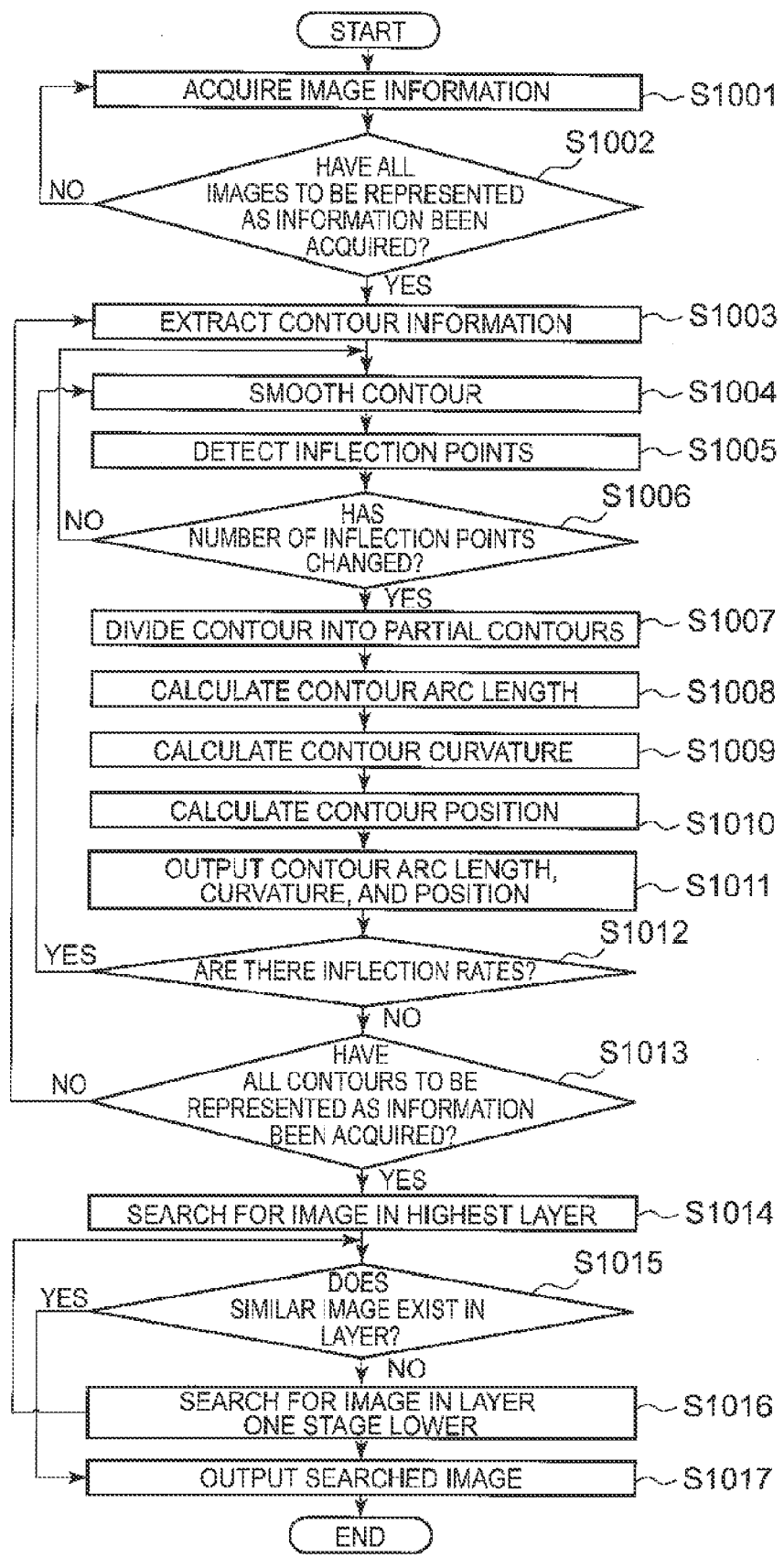
FIG. 12 is a flowchart illustrating an example of an operation of the image processing device of FIG. 1.

FIG. 12 is a flowchart illustrating an example of an operation of the image processing device of FIG. 1. As illustrated, first, the image information acquisition unit 101 of the image processing device acquires image information specified by a user (Step S1001). The acquisition of the image information is not limited to the specification by the user, and the image information may be automatically acquired. For example, depending on a detection result of a sensor or the like, an image is acquired from imaging means.

Then, the image information acquisition unit 101 checks whether all specified pieces of image information have been acquired (Step S1002). If the acquisition is not complete for all the specified pieces of image information (NO in Step S1002), the image information acquisition unit 101 repeats Steps S1001 and S1002 until all the specified pieces of image information are acquired. When all the specified pieces of image information have been acquired (YES in Step S1002), the image information acquisition unit 101 sends the acquired image information to the contour extraction unit 102.

The contour extraction unit 102 extracts contour information included in the image based on the image information sent from the image information acquisition unit 101 (Step S1003). The extraction of the contour information can be carried out only for contour lines that satisfy predetermined criteria set by the user in advance such as contour lines having a length longer than a threshold. The contour information extracted by the contour extraction unit 102 is sent to the contour smoothing unit 103.

Then, the contour smoothing unit 103 smoothes a contour line based on the contour information from the contour extraction unit 102 (Step S1004). The contour smoothing unit 103 detects the number of inflection points (Step S1005), and determines whether or not the number of inflection points is decreased to a number (corresponding to a certain smoothing stage) set in advance (Step S1006). The smoothing is repeated until the number of inflection points matches (is decreased to) the number set in advance. In order to carry out the smoothing on a plurality of stages, the number set in advance used in Step S1006 is a value which is different depending on the smoothing level.

The contour division unit 104 divides a contour line smoothed on a certain stage into one or more divided contour lines (Step S1007). This division is carried out while points characteristic in degree of curvature in the smoothed contour line are considered as division points.

For each of the divided contour lines divided by the contour division unit 104, the contour arc length calculation unit 105 calculates an arc length (Step S1008), the contour curvature calculation unit 106 calculates a curvature (Step S1009), and the contour position calculation unit 107 calculates a position (Step S1010).

The contour arc length/curvature/position output unit 108 outputs the arc length/curvature/position information calculated in Steps S1005 to S1007 to the contour arc length/curvature/position information storage unit 202, thereby controlling the contour arc length/curvature/position information storage unit 202 to store the arc length/curvature/position information (Step S1011).

Thereafter, or in parallel with Steps S1007-S1011, the contour smoothing unit 103 determines whether or not the number of the inflection points reaches zero or a number equal to or less than the number specified in advance (S1012). In other words, the contour smoothing unit 103 determines, for all the plurality of stages, whether or not a smoothed contour line is obtained. When a smoothed contour line is not obtained for all the smoothing levels, the contour smoothing unit 103 returns to Step S1004, and repeats the subsequent processing.

Then, the contour extraction unit 102 determines whether or not all the contour lines included in the image information from the image information acquisition unit 101 are extracted (Step S1013). This is processing for a case where there are a plurality of contour lines, in particular, a case where a single object has a plurality of contour liens (a single object is constituted by a plurality of parts). When there are contour lines which have not been extracted, Steps S1003-S1013 are repeated.

When, in Step S1013, the result of the determination is YES, the image determination unit 109 determines, based on the information stored in the contour arc length/curvature/position information storage unit 202, whether or not a certain image and one or more other images are similar to each other. The determination is carried out for each of the smoothing levels.

For example, when an image most similar to a certain image (search key image) is searched from a plurality of images (images subject to the search), information on the search key image and the information on the images subject to the search stored in the contour arc length/curvature/position information storage unit 202 are compared.

First, pieces of information obtained from contour lines lowest in degree of smoothing (in the highest layer) for the respective images are compared with each other (Step S1014). When pieces of information matching (or similar to) each other exist (YES in Step S1015), the image determination unit 109 outputs a searched image corresponding to the information as a similar image (Step S1017).

When matching (or similar) information does not exist (NO in Step S1015), the image determination unit 109 compares pieces of information obtained from contour lines at a smoothing level one stage higher (in a layer one stage lower) with each other (Step S1016). When pieces of information matching (or similar to) each other exist (YES in Step S1015), the image determination unit 109 outputs a searched image corresponding to the information as a similar image (Step S1017). When matching (or similar) information does not exist (NO in Step S1015), the image determination unit 109 compares pieces of information obtained from contour lines at a smoothing level one stage higher with each other (Step S1016). Subsequently, until the image determination unit 109 determines that matching (or similar) information exists, or finishes the determination for the highest degree of smoothing level, Steps S1015-S1016 are repeated.

The description has been given of the case where the most similar image is output, but the search result may be output as a degree of similarity. In this case, by preparing as the images subject to the search representative images (determination criterion images) of a plurality of types of groups, to which group the search key image belongs and to what degree the search key image is similar can be output results.

As described above, according to this embodiment, by dividing each of a plurality of smoothed contour lines smoothed on a plurality of stages into one or more curves, representing each of the divided curves by the parameters including the degree of curvature and the positional relationship, and comparing the parameters (feature amounts) at each of the smoothing levels, the similarity of two images can be properly evaluated.

Moreover, by representing the plurality of divided contour lines by the parameters (determining feature amounts for each of the divided contour lines), image recognition robust against the occlusion can be carried out.

Further, by properly selecting the division points and the feature amounts, image recognition robust against the geometric transformation can be carried out.

A detailed description is now given of an image processing device according to a second embodiment of this invention used for realizing a representation method for representing an object or a shape referring to drawings.

Figure 13:
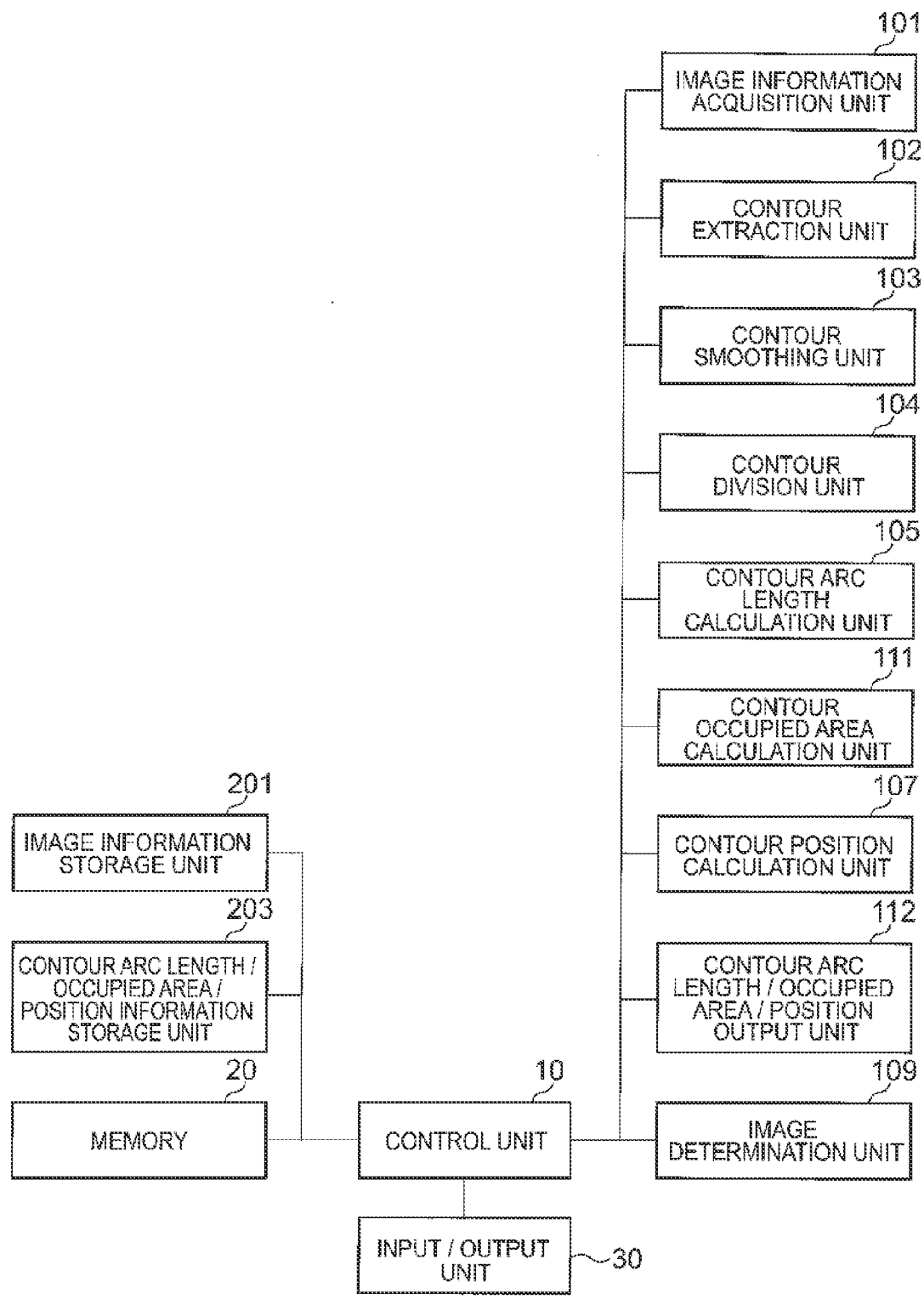
FIG. 13 is a block diagram illustrating a schematic configuration of an image processing device according to a second embodiment of this invention.

FIG. 13 is blocks illustrating a configuration of the image processing device used to realize the representation method for representing an object or a shape according to the second embodiment of this invention. Differences from the image processing device of FIG. 1 are in that the image processing device includes, in place of the contour curvature calculation unit 106, a contour occupied area calculation unit 111, and, in place of the contour arc length/curvature/position output unit 108, a contour arc length/occupied area/position output unit 112. Resulting from these changes, the contour arc length/curvature/position storage unit 202 is renamed to a contour arc length/occupied area/position information storage unit 203. Further, even with the same names, in order to respond to the changes, there are elements having functions different from those of the image processing device of FIG. 1. A description is now given of different points from the image processing device of FIG. 1.

The contour occupied area calculation unit 111 calculates an area (also referred to as contour occupied area) characteristic to each of the divided contour lines divided by the contour division unit 104. The affine curvature used in the first embodiment drastically changes in value, and is difficult to handle. In contrast, the contour occupied area is limited in a range of change, is easy to handle, and facilitates recognition of an object or a shape.

Figure 14:
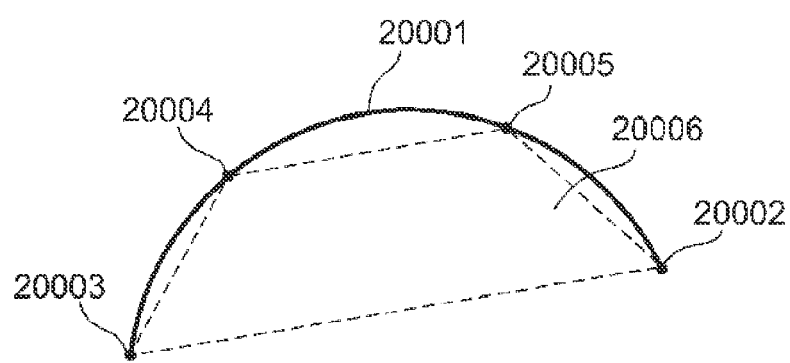
FIG. 14 is a diagram illustrating a characteristic area of a divided contour line.

On this occasion, the characteristic area is, for example, an area determined depending on each divided contour line 20001 as illustrated in FIG. 14. In other words, the characteristic area is an area calculated by using points that can be determined by the shape of each divided contour line. In detail, an area of a quadrangle obtained by connecting four points, which are both end points 20002 and 20003 of the divided contour line 20001, and points 20004 and 20005 which equally divide (in this case, into three equal parts) a contour arc length represented by an affine arc length of the divided contour line 20001, may be considered as the characteristic area. An area of a region enclosed by a line connecting the both end points 20002 and 20003 of the divided contour line 20001 with each other, and the divided contour line 20001 may be considered as the characteristic area. However, the area of the region enclosed by the four points 20002-20005 is preferably used. These four points are constituted by the end points which are invariables with respect to the projective transformation and the two points which divide the affine arc length, which is an invariable with respect to the affine transformation, into the three equal parts, and the area enclosed by the four points is thus an invariable with respect to the equivalent affine transformation, and is an amount robust against the geometric transformation. The number of divisions of the contour arc length represented by the affine arc length should be equal to or more than two (equal to or more than two equal divisions). If the number of divisions is two, the contour occupied area calculation unit 111 determines the area of a triangle obtained by connecting both the end points 20002 and 20003 of the divided contour line 20001 and one division point with each other as the contour occupied area.

By determining a contour occupied area for each of the divided contour lines, if the number of the divided contour lines are two or more, a relative relationship thereamong can be determined, which is effective for recognition in a case where only a more partial shape than that in the first embodiment can be detected.

Both the contour arc length and the contour occupied area are invariables with respect to the equivalent affine transformation, and by taking a ratio of one to the other thereof, an invariable with respect to the affine geometric transformation accompanying scaling can be provided.

The contour arc length/occupied area/position output unit 112 outputs the arc length information, the occupied area information, and the position information respectively calculated by the contour arc length calculation unit 105, the contour occupied area calculation unit 111, and the contour position calculation unit 107 to the contour arc length/occupied area/position information storage unit 203. The pieces of information output by the contour arc length/occupied area/position output unit 112 are similar to the pieces of information (FIG. 8) output by the contour arc length/curvature/position output unit 108. However, in place of the curvature information, the occupied area information is included.

The contour position calculation unit 107 may be different from that of the first embodiment, and may calculate a contour position by means of an approach similar to that of deriving the occupied area by the contour occupied area calculation unit 111. Employment of the approach enables description of a positional relationship to be invariant with respect to the affine geometric transformation.

Moreover, an invariable calculated from the positional relationship may be added to the characteristic amounts. The invariable calculated from the positional relationship is, for example, an area enclosed by four representative points extracted from division points (inflection points) calculated by the contour division unit 104. This amount provides an invariable with respect to the equivalent affine geometric transformation. Further, by taking a ratio of one to the other of areas of two triangles divided by a diagonal line of the four points, an invariable with respect to the affine geometric transformation accompanying scaling is obtained.

Figure 15:
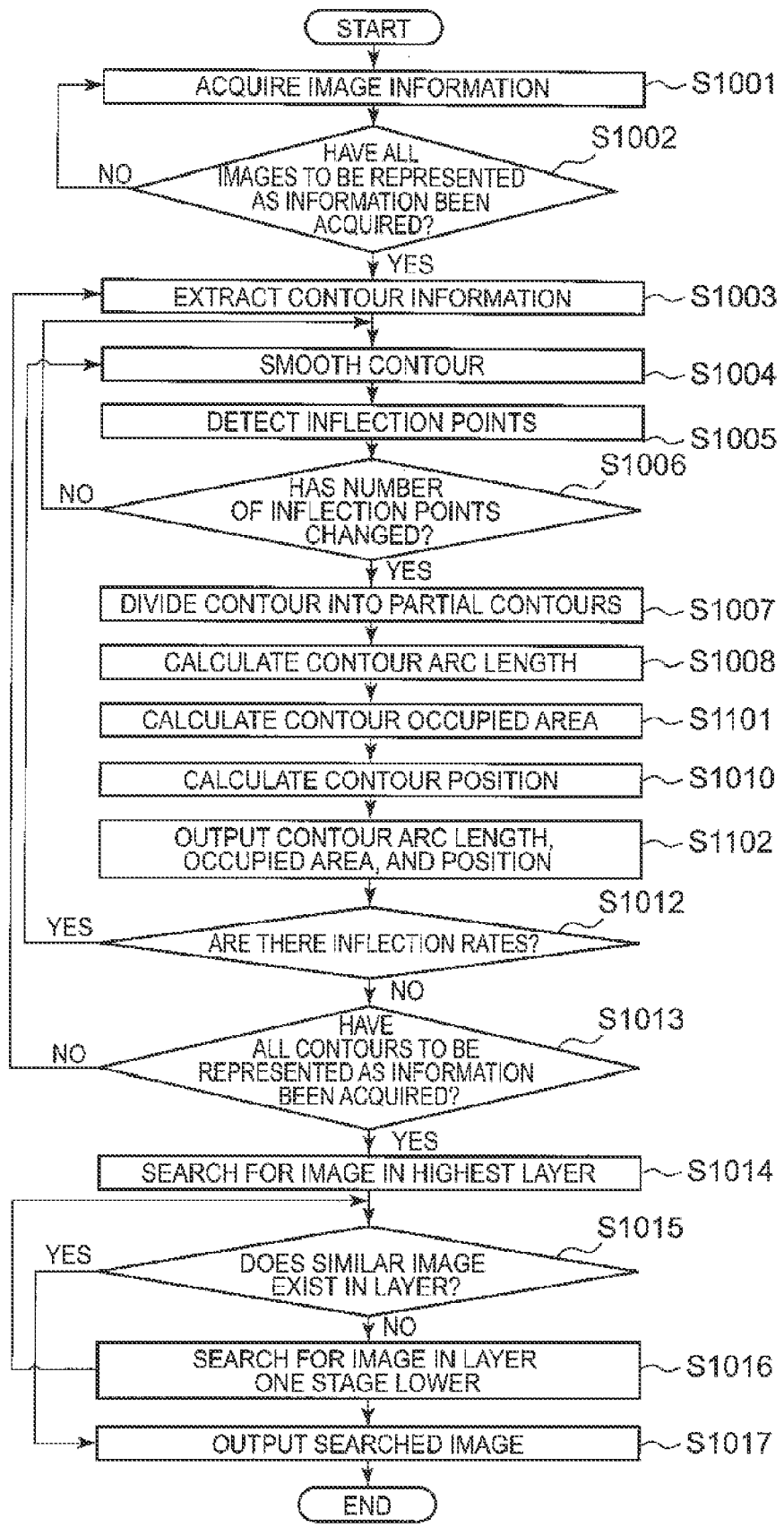
FIG. 15 is a flowchart illustrating an example of an operation of the image processing device of FIG. 13.

Referring to FIG. 15, a description is now given of an operation of the image processing device illustrated in FIG. 13. A different point from the operation of FIG. 12 is that, in place of Step S1009, the contour occupied area calculation unit 111 calculates the occupied area (Step S1101). As a result, Step S1011 is also changed to Step S1102 where the contour arc length/occupied area/position output unit 112 outputs the contour length/occupied area/position information calculated in Steps S1008, S1101, and S1010.

According to this embodiment, by using, in place of the affine curvature, the contour occupied area, in addition to the effects brought about by the first embodiment, the determined feature amount is easy to handle, resulting in facilitation of recognition of the object or the shape.

A detailed description is now given of an image processing device according to a third embodiment of this invention used for realizing a representation method for representing an object or a shape referring to drawings.

Figure 16:
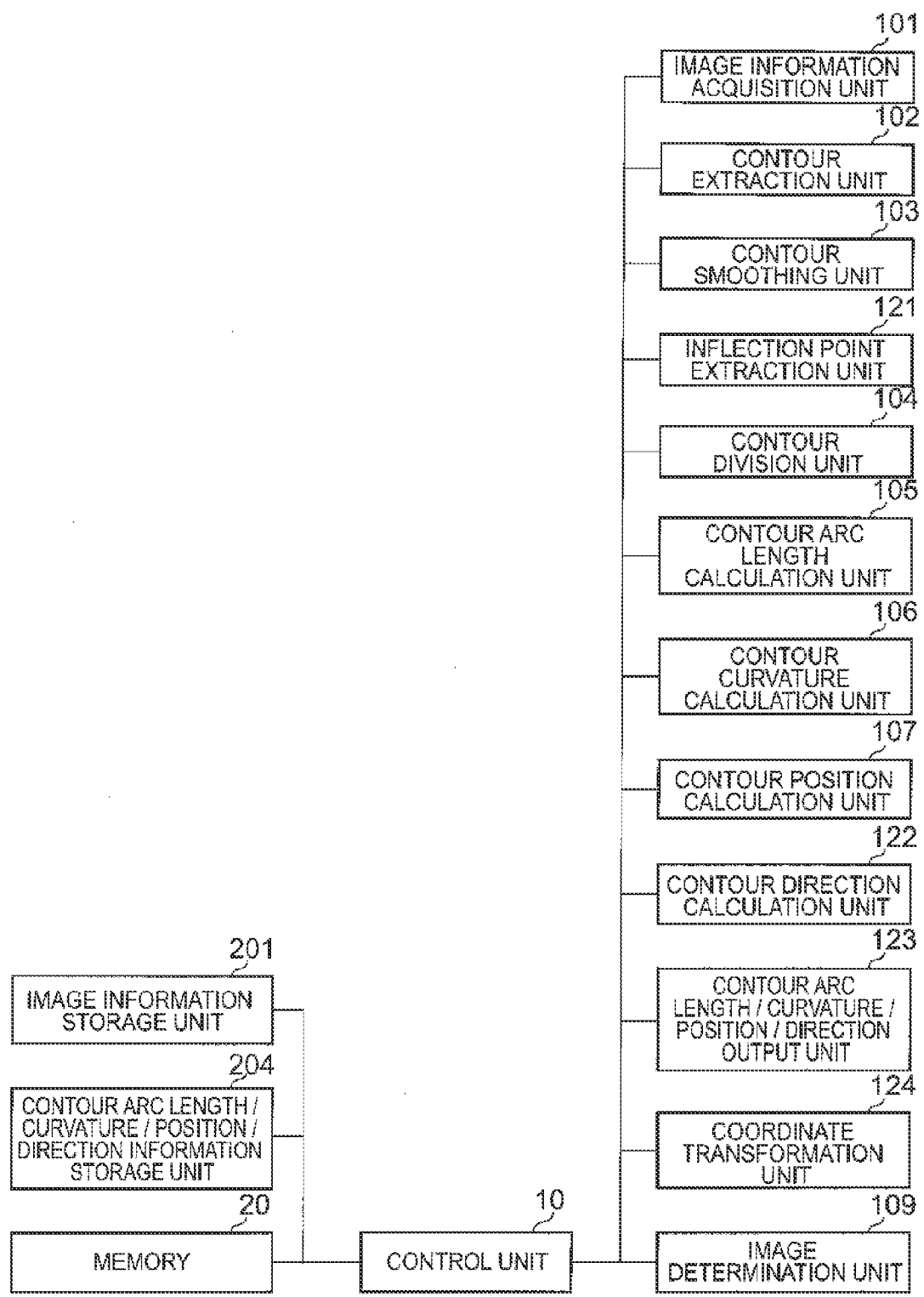
FIG. 16 is a block diagram illustrating a schematic configuration of an image processing device according to a third embodiment of this invention.

FIG. 16 is blocks illustrating a configuration of the image processing device used to realize the representation method for representing an object or a shape according to the third embodiment of this invention. Differences from the image processing device of FIG. 1 are in that an inflection point extraction unit 121, a contour direction calculation unit 122, and a coordinate transformation unit 124 are newly added as well as in that, in place of the contour arc length/curvature/position output unit 108, the image processing device includes the contour arc length/curvature/position/direction output unit 123. Further, even with the same names, in order to respond to the changes, there are elements having functions different from those of the image processing device of FIG. 1. A description is now given of different points from the image processing device of FIG. 1.

The inflection point extraction unit 121 extracts inflection points on a contour by means of a method similar to that of the contour division unit 104 in the first embodiment. On this occasion, if an inflection point is not observed, the number of extracted inflection points is zero.

The contour division unit 104 further divides a region (referred to as contour segment) between inflection points (into contour sub-segments), which is different from the method of using an inflection point as a contour division point in the contour division unit 104 in the first embodiment. The method of dividing the contour segment includes dividing a single contour segment so that, for example, the numbers of contour sub-segments in the single contour segment are the same, and so that arc lengths of the contour sub-segments in the single contour segment are equal. The method of generating the contour sub-segments is not limited to this approach, and any approach can be used. As a result, the devices subsequent to the contour arc length calculation unit 105 carry out processing for the respective contour sub-segments.

The contour direction calculation unit 122 is a processing unit newly added to the first embodiment. In the first embodiment, the contour position calculation unit 107 may calculate the direction, but in the third embodiment, the contour direction calculation unit 122 calculates the direction. As a result, the contour position calculation unit 107 calculates a position different from the direction information. For example, by using the Cartesian coordinate system, to identify a two-dimensional position in an image, a position can be calculated. As a result of addition of the contour direction calculation unit 122, the contour arc length/curvature/position output unit 108 is changed to the contour arc length/curvature/position/direction output unit 123, which outputs, in addition to the contour arc length/curvature/position information, newly the direction, and similarly, the contour arc length/curvature/position information storage unit 202 is changed to the contour arc length/curvature/position/direction information storage unit 204.

The coordinate transformation unit 124 properly transforms the coordinates of the image acquired by the image information acquisition unit 101 so that the coordinates correspond to each of images included in the image information storage unit 201. Moreover, the coordinate transformation unit 124 also carries out the coordinate transformation for the contour arc length/curvature/position/direction information output by the contour arc length/curvature/position/direction output unit 123. The coordinate transformation is carried out so that the contour arc length/curvature/position/direction information output for the image acquired by the image information acquisition unit 101 most closely approximates the contour arc length/curvature/position/direction information corresponding to each of the images included in the image information storage unit 201. For the coordinate transformation, for example, linear transformations such as the translation, the rotation, the scaling, the affine geometric transformation, and the projective geometric transformation in the two-dimensional Cartesian coordinate system can be used. As the transformation means used for the coordinate transformation, any transformation means may be used irrespective of whether the transformation means is linear transformation means or nonlinear transformation means.

Figure 17:
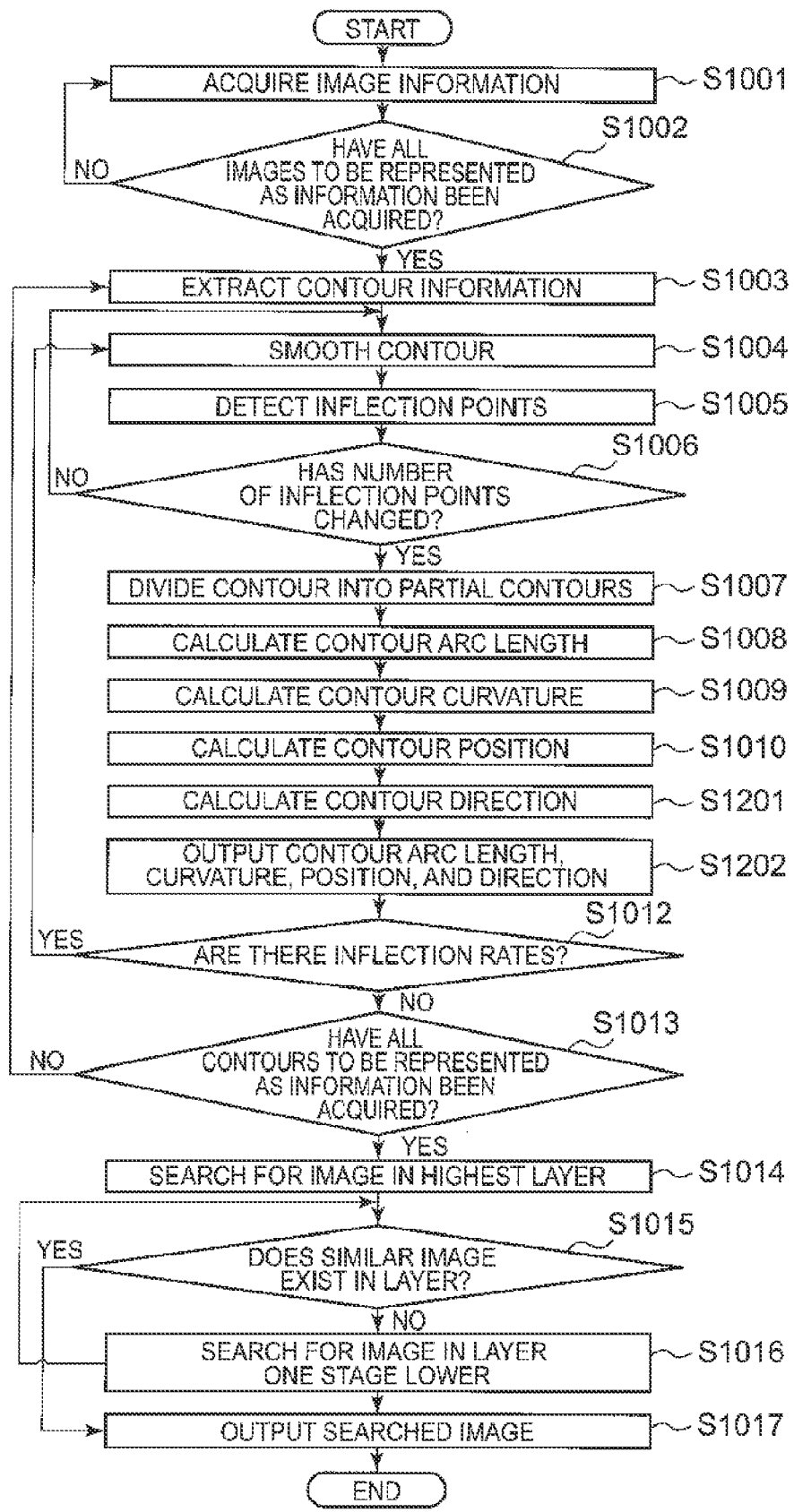
FIG. 17 is a flowchart illustrating an example of an operation of the image processing device of FIG. 16.

Referring to FIG. 17, a description is now given of an operation of the image processing device illustrated in FIG. 16. A different point from the operation of FIG. 12 is that, after Step S1010, the contour direction calculation unit 122 calculates the contour direction (Step S1201). As a result, Step S1011 is also changed to Step S1202 where the contour arc length/curvature/position/direction output unit 123 outputs the arc length/curvature/position/direction information calculated in Steps S1008, S1009, S1010, and S1201. Further, in FIG. 17, the partial contours divided in Step S1007 correspond to the sub-segments. Moreover, the search for images in Step S1014 accompanies the coordinate transformation by the coordinate transformation unit 124.

According to this embodiment, by dividing a counter on the two stages corresponding to the segment and the sub-segment, and by using the coordinate transformation, in addition to the effects of the first embodiment, the following effects are expected.

First, the segment contributes to a high-speed search for corresponding points in two images.

Then, the sub-segment can describe, in detail, characteristics of a local contour in the segment (between inflection points).

Finally, the coordinate transformation contributes to robust image recognition regardless of a distortion of an image.

This invention has now been described by way of several embodiments, but this invention is not limited to those embodiments and various modifications and variations may be made without departing from the scope of the invention.

For example, in the above-mentioned embodiments, the combination between the contour arc length calculation unit 105 and the contour curvature calculation unit 106 or the contour occupied area calculation unit 111 is exemplified, but in place of the combination, a combination between the contour curvature calculation unit 106 and the contour occupied area calculation unit 111 may be used. Further, the contour direction calculation unit 122 may be combined. In these cases, other related components are, depending on the combination, changed as appropriate.

Moreover, according to the above-mentioned embodiments, though a description is given of the image processing device dedicated to the image processing, by controlling a general computer to execute a program to carry out the above-mentioned processing, the computer may be operated as the image processing device. In other words, this invention can be provided as the program which controls the computer to carry out the above-mentioned image processing method. Alternatively, the program can be provided as a computer-readable, non-transitory information recording medium having the program stored thereon. If a general computer is used to be operated as the image processing device of FIG. 1, for example, the computer needs to include at least the control unit 10, the memory 20, and the input/output unit 30. The memory 20 stores the program, and serves as the image information storage unit 201 and the contour arc length/curvature/position information storage unit 202. Moreover, the control unit 10 serves, by executing the program, as the image information acquisition unit 101 to the image determination unit 109. Depending on necessity, a read device for reading the program from the information recording medium, and transfers the read program to the memory 20 or the like is provided.

Moreover, a part or an entirety of the above-mentioned embodiments may be described as the following notes, but this invention is not limited thereto.

(Note 1) An image processing method, including: identifying, by processing image data, a contour line of an object included in an image represented by the image data; smoothing the contour line stepwise to obtain smoothed contour lines on a plurality of stages; determining a feature amount for each of the smoothed contour lines on the plurality of stages; and determining, based on the determined feature amount of the smoothed contour line on each of the stages and a feature amount corresponding to each of the stages determined in advance for an object for comparison, a degree of similarity of the object and the object for comparison to each other.

(Note 2) An image processing method as described in Note 1, in which the step of determining the feature amount includes dividing each of the smoothed contour lines on the plurality of stages into one or more partial contour lines, and determining the feature amount for each of the divided contour lines.

(Note 3) An image processing method as described in Note 2, in which the feature amount includes information on a position and a degree of curvature of each of the partial contour lines.

(Note 4) An image processing method as described in Note 3, in which the information on the degree of curvature is an area of a region enclosed by straight lines connecting a plurality of points existing on the partial contour line, or a plurality of points defined depending on a shape of the partial contour line with each other.

(Note 5) An image processing method as described in Note 3, in which the information on the degree of curvature is a combination of two or more of an area of a region enclosed by straight lines connecting a plurality of points existing on the partial contour line, or a plurality of points defined depending on a shape of the partial contour line with each other, an arc length of the partial contour line, and a curvature of the partial contour line.

(Note 6) An image processing method as described in Note 5, in which the information on the degree of curvature of the curve is represented by the following two: an arc length and a curvature of the curve.

(Note 7) An image processing method as described in Note 6, in which the arc length and the curvature are respectively an affine arc length and an affine curvature.

(Note 8) An image processing method as described in any one of Notes 4 to 7, in which the plurality of points existing on the partial contour line, or the plurality of points defined depending on the shape of the partial contour line are at invariant positions with respect to an affine geometric transformation.

(Note 9) An image processing method as described in any one of Notes 2 to 8, in which a division point at which the dividing into the one or more partial contour lines is carried out includes an inflection point at which a sign of a curvature on the contour line changes.

(Note 10) An image processing method as described in any one of Notes 2 to 9, in which a method used for the dividing into the one or more partial contour lines uses a division method on two stages involving carrying out global division based on inflection points at which a sign of a curvature on the contour line changes, and further locally dividing a region between the inflection points.

(Note 11) An image processing method as described in Note 4 or 5, in which the area is an area of a region defined by end points on both sides of the partial contour line, and division points when the partial contour line is divided into a plurality of parts based on an affine arc length.

(Note 12) An image processing method as described in any one of Notes 3 to 11, in which the information on the position of the partial contour line is an invariable with respect to an affine geometric transformation.

(Note 13) An image processing method as described in any one of Notes 3 to 12, in which the information on the position of partial contour line is a number assigned in sequence along the contour line or coordinates.

(Note 14) An image processing method as described in any one of Notes 1 to 13, in which the feature amount further includes information on a direction of each of the partial contour lines.

(Note 15) An image processing device for carrying out the image processing method as described in any one of Notes 1 to 14.

(Note 16) A program for controlling a computer to carry out the image processing method as described in any one of Notes 1 to 15.

INDUSTRIAL APPLICABILITY

This invention can be used for applications such as, in recognition of an object in a general image or motion image, search for a desired image and classification of an image. In particular, this invention can be used for applications such as search and classification of similar but different images.

This application claims priority from Japanese Patent Application No. 2010-263877, filed on Nov. 26, 2010, and Japanese Patent Application No. 2011-213005, filed on Sep. 28, 2011, the entire disclosure of which is incorporated herein by reference.

REFERENCE SIGNS LIST 10 control unit
20 memory
30 input/output unit
101 image information acquisition unit
102 contour extraction unit
103 contour smoothing unit
104 contour division unit
105 contour arc length calculation unit
106 contour curvature calculation unit
107 contour position calculation unit
108 contour arc length/curvature/position output unit
109 image determination unit
111 contour occupied area calculation unit
112 contour arc length/occupied area/position output unit
121 inflection point extraction unit
122 contour direction calculation unit
123 contour arc length/curvature/position/direction output unit
124 coordinate transformation unit
204 contour arc length/curvature/position/direction information storage unit
201 image information storage unit
202 contour arc length/curvature/position information storage unit
203 contour arc length/occupied area/position information storage unit
20001 divided contour line
20002, 20003 end point
20004, 20005 point which equally divides contour arc length represented by affine arc length

The invention claimed is:

1. An image data processing method for processing, by a processing unit, image data of an object or a shape by comparing the image data with comparison image data stored in an image information memory to determine a degree of similarity of the object or the shape and the comparison image data, comprising:
extracting contour information of an entirety or a part of the object or the shape from the image data;
stepwise smoothing the contour information of the entirety or the part of the object or the shape over a plurality of stages to obtain smoothed contour lines on each stage;
processing the contour information represented by each smoothed contour line on each stage to divide a contour shape represented by the contour information into one or a plurality of divided curves at each inflection point of each smoothed contour line by calculating a degree of curvature of each curve to store the degree of the curvature as information of each divided curve in the information memory; and
obtaining a feature amount of each divided curve on each of the stages to store the feature amount of the smoothed contour lines in the information memory to compare the feature amount with the corresponding feature amount of the comparison image data and to determine the degree of the similarity of the image data with the comparison image data.

2. An image data processing method according to claim 1, wherein the degree of curvature of the curve is represented by an area calculated by using a plurality of points on the curve or a plurality of points in positions which are determinable by a shape of the curve.

3. An image data processing method according to claim 1, wherein the degree of curvature of the curve is represented by any two or more of an area calculated by using a plurality of points on the curve or a plurality of points in positions which are determinable by a shape of the curve, an arc length of the curve, and a curvature of the curve.

4. An image data processing method according to claim 1, wherein the degree of curvature of the curve is represented by the following two: an arc length of the curve and a curvature of the curve.

5. An image data processing method according to claim 1, wherein an arc length of the curve and a curvature of the curve are respectively an affine arc length and an affine curvature.

6. An image data processing method according to claim 1, wherein positions of a plurality of points on the curve or a plurality of points in positions which are determinable by the shape of the curve are invariant positions with respect to an affine geometric transformation.

7. An image data processing method according to claim 1, wherein a division point at which the division is carried out includes an inflection point at which a sign of a curvature on a contour changes.

8. An image data processing method according to claim 1, wherein a method used for the dividing uses a division method on two stages involving:
   carrying out global division based on inflection points at which a sign of a curvature on a contour changes; and
   further locally dividing a region between the inflection points.

9. An image data processing method according to claim 1, wherein an area defined by the curve is derived by using at least three points out of division points for dividing the curve into a plurality of parts based on an affine arc length of the curve as an index, and end points of the curve.

10. An image data processing method according to claim 1, wherein a positional relationship between the one or the plurality of curves is represented by an invariable with respect to an affine geometric transformation.

11. An image data processing method according to claim 1, wherein a positional relationship of the curve is a positional relationship among the one or the plurality of curves obtained by the dividing or a positional relationship among the one or the plurality of curves obtained by the dividing in a plurality of the contour shapes.

12. An image data processing method according to claim 1, wherein the positional relationship of the curve is represented by one or more indices selected from objective indices including a sequence or coordinates of the each curve.

13. An image data processing method according to claim 1, wherein the each curve obtained by the dividing is represented by parameters including a direction in addition to the degree of curvature and the positional relationship of the curve.

14. An image data processing method according to claim 1, wherein the each curve obtained by the dividing is represented by a plurality of pieces of stratified information.

15. An image data processing method according to claim 1, wherein, when two of the objects or the shapes are matched to each other, the image data processing method accompanies a geometric transformation.

16. A non-transitory computer-readable program recording medium which stores a program for causing a computer to execute the method of claim 1.

17. An image data processing system for processing image data of an object or a shape by comparing the image data with comparison image data stored in an image information memory to determine a degree of similarity of the object or the shape and the comparison image data, comprising:
   a contour extractor configured to extract a contour information of an entirety or a part of the object or the shape from the image data;
   a smoothing unit configured to stepwise smooth the contour information over a plurality of stages to obtain smoothed contour lines on each stage;
   a processing unit configured to process the contour information represented by each smoothed contour line on each stage to divide a contour shape of the smoothed contour lines into one or a plurality of curves at each inflection point of each smoothed contour line by calculating a degree of curvature of each curve and to store the degree of the curvature as information of each divided curve in the information memory; and
   a calculation unit configured to obtain a feature amount of each divided curve on each of the stages to store the feature amount of the smoothed contour lines in the information memory to compare the feature amount with the corresponding feature amount of the comparison image data and to determine the degree of the similarity of the image data with the comparison image data.

* * * * *